United States Patent Office 3,470,156
Patented Sept. 30, 1969

3,470,156
6,6-ETHYLENE-1,2-METHYLENESTEROIDS
Kenneth G. Holden, Stratford, N.J., assignor to Smith Kline & French Laboratories, Philadelphia, Pa., a corporation of Pennsylvania
No Drawing. Filed Jan. 30, 1967, Ser. No. 612,356
Int. Cl. C07c *169/22, 173/00*
U.S. Cl. 260—239.55                7 Claims

ABSTRACT OF THE DISCLOSURE 6,6-ethylene-1α,2α-methyleneandrost-4-en-3-ones, substituted at the 17-position by a hydroxy group, which is free, esterified, or etherified. The compounds are prepared by reaction of the androsta-1,4-diene with trimethyl sulfoxonium methylide and subsequent esterification or etherification of the 17-hydroxy group. The compounds possess anabolic activity.

This invention relates to steroid compounds having anabolic activity. In particular, the invention relates to 6,6-ethylene-1,2-methyleneandrost-4-en-3-ones.

The compounds of the invention are represented by the following structural formula:

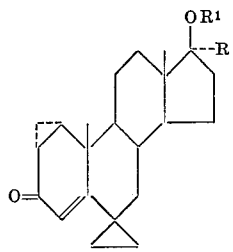

wherein:

R is hydrogen, methyl, or ethyl; and
R$^1$ is hydrogen, or when R is hydrogen, acyl derived from a carboxylic acid having up to about 9 carbon atoms, cyclopentenyl, or tetrahydropyranyl.

The compounds of the invention are prepared by reaction of a 6,6-ethyleneandrosta-1,4-dien-3-one with dimethyl sulfoxonium methylide. The latter reagent is generated in situ from trimethyl sulfoxonium iodide in dimethyl sulfoxide and sodium hydride. The required steroidal diene is obtained by dehydrogenation of the corresponding Δ$^4$-androstene, preferably with 2,3-dichloro-5,6-dicyanobenzoquinone, or alternatively with an organism known to microbiologically dehydrogenate steroids at the 1,2 position. The starting 6,6-ethylene-17β-hydroxyandrost-4-en-3-ones are described in Netherlands Patent 66/03861.

When R is hydrogen, various esters and ethers may be prepared by conventional methods. The esters are prepared by treating the 17-alcohol in the presence of a base such as pyridine with an acid anhydride or acid halide derived from a craboxylic acid having up to about 9 carbon atoms. Among the suitable acids from which the acid halide or acid anhydride may be derived are acetic, propionic, butyric, isobutyric, caproic, phenylpropionic, cyclohexylpropionic, and benzoic acids. A tetrahydropyranyl ether is prepared by treating the 17-alcohol with dihydropyran in the presence of p-toluenesulfonic acid. A cyclopentenyl ether is prepared by heating the 17-alcohol with cyclopentanone diethyl ketal.

The compounds of the present invention possess anabolic activity. They have been found to increase levator ani weights in rats treated subcutaneously with 20 mg./kg. of the compound in a sesame oil vehicle. They are used in those instances where it is desired to reverse a negative nitrogen balance and effect tissue building. The compound where R and R$^1$ are both hydrogen, 6,6-ethylene-1α-2α-methylene-17β-hydroxyandrost-4-en-3-one, also possesses natriuretic activity. The compounds are formulated for use into conventional dosage forms by well-known methods, using conventional pharmaceutical excipients.

Certain obvious variants in the compounds of the invention and the processes for their preparation may occur to those skilled in the art of medicinal chemistry. Such variants are intended to be within the scope of the present invention.

The following examples are intended to illustrate the preparation of the compounds of the invention, but are not to be construed as limiting the scope thereof.

Example 1.—6,6-ethylene-1α,2α-methylene-17β-hydroxyandrost-4-en-3-one

To a stirred solution of 17.5 g. of trimethyl sulfoxonium iodide in 175 ml. of dimethyl sulfoxide is added 3.5 g. of a 55% dispersion of sodium hydride in mineral oil. The addition is made in portions under a nitrogen atmosphere. Fifteen minutes after the addition is complete, 5.0 g. of 6,6-ethylene-17β-hydroxyandrosta-1,4-dien-3-one is added. The reaction mixture is warmed to 50° for 4 hours and is then maintained at 25° for an additional 18 hours. The reaction mixture is poured into 1 l. of water; and the precipitate is collected by filtration, washed with water and hexane, dried, and recrystallized from acetone-hexane to yield 6,6-ethylene-1α,2α-methylene - 17β - hydroxyandrost-4-en-3-one, M.P. 215–217°, [α]$_D^{25}$+384°

(CH$_3$OH)

ultraviolet absorption: λ$_{max.}$ 244 mμ (ε, 12,150).

Use of 6,6 - ethylene-17β-hydroxy-17α-methylandrosta-1,4-dien-3-one or 6,6-ethylene-17β-hydroxy-17α-ethylandrosta-1,4-dien-3-one in the above procedure in place of 6,6-ethylene-17β-hydroxyandrosta - 1,4 - dien-3-one results in the formation of 6,6-ethylene-1α,2α-methylene-17β-hydroxy - 17α - methylandrost-4-en-3-one or 6,6-ethylene-1α,2α-methylene-17β-hydroxy - 17α - ethylandrost-4-en-3-one, respectively.

Example 2.—6,6 - ethylene - 1α,2α - methylene - 17β-hydroxyandrost - 4 - en - 3 - one 17 - tetrahydropyran-2-yl ether A suspension of 1.35 g. of 6,6-ethylene-1α,2α-methylene - 17β - hydroxyandrost - 4 - en - 3 - one in 15 ml. of benzene and 1.5 ml. of dihydropyran containing 0.013 g. of p-toluenesulfonic acid is stirred at 25° for 15 minutes. The resulting solution is diluted with benzene and extracted with 5% aqueous sodium bicarbonate solution, then with water containing a little pyridine. The dried benzene layer is evaporated to an oil, which deposits crystals from a petroleum ether solution. The crystalline material, designated as isomer A, is one of the two possible isomers of 6,6-ethylene-1α,2α-methylene-17β-hydroxyandrost - 4 - en - 3 - one 17 - tetrahydropyran - 2 - yl ether, M.P. 118°. The other isomer, B, is obtained from the remaining petroleum ether solution by chromatography on alumina.

Example 3.—6,6 - ethylene - 1α,2α - methylene - 17β-hydroxyandrost - 4 - en - 3 - one 17 - cyclopenten - 1-yl ether A mixture of 5 g. of 6,6-ethylene-1α,2α-methylene-17β-hydroxyandrost-4-en-3-one and 10 ml. of cyclopentanone diethyl ketal is placed in a flask with a water trap and heated at 150–175° (bath temperature) until no more distillation occurs. The residue is cooled and diluted with aqueous methanol containing a few drops of pyridine. The mixture is then cooled to give the title product, which either precipitates out or is extracted with a solvent such as ether.

Example 4

To a solution of 1 g. of 6,6-ethylene-1α,2α-methylene-17β-hydroxyandrost-4-en-3-one in 100 ml. of anhydrous pyridine is added 6 ml. of acetic anhydride. The reaction mixture is allowed to stand overnight at room temperature and then poured into ice water. The resulting precipitate is then filtered off and recrystallized to give 6,6-ethylene - 1α,2α - methylene - 17β - hydroxyandrost - 4 - en-3-one 17 acetate.

Use of an equivalent amount of propionic anhydride, butyric anhydride, caproic anhydride, phenylpropionyl chloride, cyclohexylpropionyl chloride, or benzoyl chloride results in the formation of the propionate, butyrate, caproate, phenylpropionate, cyclohexylpropionate, or benzoate esters, respectively.

Preparation 1.—6,6-ethylene-17β-hydroxyandrosta-1,4-dien-3-one

A suspension of 8.0 g. of 6,6-ethylene-17β-hydroxyandrost-4-en-3-one and 7.4 g. of DDQ (2,3-dichloro-5,6-dicyanobenzoquinone) in 65 ml. of dioxane is stirred at reflux under a nitrogen atmosphere for between 2 and 3 hours. The cooled reaction mixture is filtered and the filter cake is washed well with methylene chloride. The total filtrate is evaporated to dryness, and the residue is dissolved in benzene and filtered through a column of 100 g. of alumina (Woelm, activity III). The column is then eluted with benzene, benzene-methylene chloride (3:1 and 1:1), and finally methylene chloride. The first fraction contains an appreciable amount of 6,6-ethylene-androsta-1,4-diene-3,17-dione. The remaining fractions are combined and recrystallized from methanol-water to give 6,6 - ethylene - 17β - hydroxyandrosta - 1,4 - dien - 3-one, M.P. 176–178°.

Use of an equivalent amount of 6,6-ethylene-17β-hydroxy - 17α - methylandrost - 4 - en - 3 - one or 6,6 - ethylene - 17β - hydroxy - 17α - ethylandrost - 4 - en - 3 - one in the above procedure in place of 6,6-ethylene-17β-hydroxyandrost-4-en-3-one results in the formation of 6,6-ethylene - 17β - hydroxy - 17α - methylandrosta - 1,4-dien - 3 - one or 6,6 - ethylene - 17β - hydroxy - 17α - ethylandrosta-1,4-dien-3-one, respectively.

I claim:
1. A compound of the formula

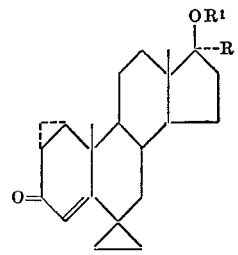

wherein:

R is hydrogen, methyl, or ethyl; and

R¹ is hydrogen, or when R is hydrogen, acyl derived from a carboxylic acid having up to about 9 carbon atoms, cyclopentenyl, or tetrahydropyranyl.

2. A compound as claimed in claim 1, wherein R is hydrogen.

3. The compound 6,6 - ethylene - 1α,2α - methylene-17β-hydroxyandrost-4-en-3-one.

4. The compound 6,6 - ethylene - 1α,2α - methylene-17β - hydroxyandrost - 4 - en - 3 - one 17 - tetrahydropyran-2-yl ether.

5. The compound 6,6 - ethylene - 1α,2α - methylene-17β - hydroxyandrost - 4 - en - 3 - one 17 - cyclopenten-1-yl ether.

6. The compound 6,6 - ethylene - 1α,2α - methylene-17β-hydroxyandrost-4-en-3-one 17-acetate.

7. A compound as claimed in claim 1, wherein R¹ is hydrogen.

References Cited
UNITED STATES PATENTS

| | | | |
|---|---|---|---|
| 3,261,829 | 7/1966 | Colton et al. | 260—239.5 |
| 3,354,185 | 11/1967 | Wiechert et al. | 260—397.5 |
| 3,373,157 | 3/1968 | Georgian et al. | 260—239.55 |

LEWIS GOTTS, Primary Examiner

ETHEL G. LOVE, Assistant Examiner

U.S. Cl. X.R.

260—397.3, 397.4, 999